United States Patent
Ryan, Jr. et al.

(10) Patent No.: US 6,244,727 B1
(45) Date of Patent: Jun. 12, 2001

(54) OPTIC LENS CELL AND ILLUMINATED SIGNAGE HAVING A CELL ARRAY

(75) Inventors: Patrick H. Ryan, Jr.; Stephen P. Hart, both of Atlanta, GA (US)

(73) Assignee: American Signal Company, GA (US)

( * ) Notice: Subject to any disclaimer, the term of this patent is extended or adjusted under 35 U.S.C. 154(b) by 0 days.

(21) Appl. No.: 09/407,130

(22) Filed: Sep. 27, 1999

(51) Int. Cl.[7] ............................................... F21V 5/04
(52) U.S. Cl. ......................... 362/244; 362/237; 362/335
(58) Field of Search ................................. 362/235–237, 362/240, 244, 326, 335, 456, 309, 310, 355

(56) References Cited

U.S. PATENT DOCUMENTS

| | | | |
|---|---|---|---|
| D. 87,501 | 8/1932 | Adler, Jr. | D10/115 |
| D. 92,641 | 7/1934 | Adler, Jr. | D10/115 |
| D. 388,726 | 1/1998 | Wu | D10/115 |
| 1,236,137 | * 8/1917 | Bastow | 362/355 |
| 1,626,615 | * 5/1927 | Kirby et al. | 362/309 |
| 1,945,190 | * 1/1934 | Handlan | 362/309 |
| 1,995,816 | 3/1935 | Adler, Jr. | 340/907 |
| 2,096,952 | * 10/1937 | Baker | 362/235 |
| 2,817,070 | 12/1957 | Freire | 340/929 |
| 3,137,449 | 6/1964 | Lenz | 362/311 |
| 4,214,168 | * 7/1980 | Kulka | 362/235 |
| 4,240,063 | 12/1980 | Gould et al. | 340/944 |
| 4,954,822 | 9/1990 | Borenstein | 340/925 |
| 5,068,771 | 11/1991 | Savage, Jr. | 362/255 |
| 5,136,287 | 8/1992 | Borenstein | 340/925 |
| 5,174,649 | 12/1992 | Alston | 362/244 |
| 5,561,346 | 10/1996 | Byrne | 313/512 |
| 5,594,433 | 1/1997 | Terlep | 340/908.1 |
| 5,636,057 | 6/1997 | Dick et al. | 359/625 |
| 5,703,719 | 12/1997 | Chen | 359/547 |
| 5,742,120 | 4/1998 | Lin | 313/512 |
| 5,833,355 | 11/1998 | You et al. | 362/244 |
| 5,896,093 | * 4/1999 | Sjobom | 362/244 |

FOREIGN PATENT DOCUMENTS 4224061  1/1994 (DE) .

OTHER PUBLICATIONS

"12" Red LED Traffic Head" published by Budget Lighting, Inc. on or prior to Dec. 24, 1998.

"New DURALED™ from Dialight" published by Dialight, a Roxboro Company, on or prior to Dec. 24, 1998.

"Traffic Signal Lenses" published by General Signals, Inc., on or prior to Dec. 24, 1998.

* cited by examiner

*Primary Examiner*—Alan Cariaso
(74) *Attorney, Agent, or Firm*—Bernstein & Associates, PC; Jason A. Bernstein

(57) ABSTRACT

A low loss optic lens cell the cell comprising at least one and preferably a plurality of light sources such as LEDs mounted to a board and capable of being electrically connected to a power source. A lens is attached to the board in a spaced apart relationship thereto. Each lens has a flat portion, least one and preferably a plurality of convex portions, and an aperture defined in each convex portion in a generally collinear arrangement relative to a corresponding LED. A plurality of the cells may be combined into an array, arranged in a housing, and connected to an electric control for operating the cells to form lighted patterns. Low intensity light rays are maximally utilized by refracting the rays back toward the LED axis and high intensity light rays are maximally utilized by allowing them to pass through the aperture without refraction and with little or no optical losses.

Alternative embodiments of the convex lens provide convex lenses convex about one axis or two axes, semi-circular segments of the convex lens, cylindrical apertures, slotted apertures, frustum shape apertures, semi-circular apertures, and lenses and LEDs offset relative to each other.

30 Claims, 3 Drawing Sheets

OPTIC LENS CELL AND ILLUMINATED SIGNAGE HAVING A CELL ARRAY

FIELD OF THE INVENTION

The present invention relates generally to optical lenses, and more particularly, to a high efficiency optic lens cell with light emitting diodes for use in illuminated signs and signals.

BRIEF DESCRIPTION OF THE PRIOR ART

Illuminated signs and signals are commonly used in a variety of applications including traffic signal heads, pedestrian signal heads, blankout signs, lane control signal heads, portable road signs such as vehicle traffic control signs, pedestrian traffic control signs, message signs, and commercial advertising signs, and other portable and fixedly mounted signs. These lighting applications typically require a high intensity of light emission so that motorists, pedestrians, and other intended viewers will be made aware of the signage from a distance and may clearly discern the intended message even in bright daylight conditions.

To meet these high intensity of light requirements, incandescent lights have traditionally been used in such applications. There has been an increase in the use of light emitting diodes ("LEDs") for illuminated signage, however, because of their desirable properties of high reliability and energy efficiency relative to incandescent lights. A drawback to using LEDs is that they provide a relatively low intensity, accordingly large numbers of LEDs must usually be employed to produce the desired intensity; some designs use 100 LEDs to produce the equivalent of a single incandescent light bulb.

There have been developed lens systems for use with LEDs which attempt to remedy this situation by providing lenses with specific geometric shapes that refract portions of the light transmitted therethrough to obtain a redistribution of light rays for increased intensity. For example, U.S. Pat. No. 5,636,057 to Dick et al. discloses a prismatic toroidal lens with two concentric solid lens portions that refract the light rays from a corresponding LED to form a modified divergent light beam. Also, U.S. Pat. No. 5,174,649 to Alston discloses a refractive lens having a hyperboloid incident light surface and an exit surface with facets configured to provide a desired light beam spread. Additionally, U.S. Pat. No. 5,833,355 to You et al. discloses a lens with an interior surface having a plurality of geometric horizontal bands to redirect light at specific angles.

The geometric refraction lenses of Dick et al., Alston, and You et al., all provide lenses with the benefit of redistributing light rays to achieve an increased utilization of the limited light output of LEDs. Each of the lens systems, however, retains certain optical losses related to the portion of the light emitted from each LED that is directed generally along and/or within a conical distribution about the central axis of light emission of the LED. These light rays need not be refracted as they are generally directed toward their intended viewing area and/or viewers. The lenses of Dick et al., Alston, and You et al., illustrate the conventional solution to providing a lens with no refraction and zero power which is to provide a generally flat lens (a "window pane") through which light rays may be transmitted without substantial redistribution. Thus, in each of the prior art lenses, the light rays that need not be refracted are nevertheless transmitted through the lens and thereby incur optical losses because of the imperfect transmissibility of any known lens material, because of reflections at the interface of the air and the lens, and because of the accumulation of dirt and/or the like on the lens surface (See Dick et al. at FIGS. 6–7, Alston at FIGS. 1A–1D, and You et al. at FIG. 2B).

These optical losses thereby reduce the intensity of the LED light rays transmitted through the lens. The efficiency of conventional optical materials that are economically practical for such lighting applications is typical limited to about 75%, so that typically 25% or more of the portion of the LED light output that is directed by each LED toward its intended viewing area and/or viewers is lost.

There are additionally known to be lenses for use with incandescent light bulbs that have a band, slot, or other central lens portion defined therein. U.S. Pat. No. 3,137,449 to Lenz discloses a central circular portion defined in a lens with a convex surface, though only the lens surface is convex and a solid body lens is not provided. Additionally, U.S. Pat. No. 1,995,816 to Adler, Jr. discloses a lens with a band comprised of a multitude of prisms for accentuating and directing the light output. Furthermore, U.S. Pat. No. Des. 87,501 to Adler, Jr. and U.S. Pat. No. Des. 92,641 to Adler, Jr. each disclose an ornamental design for a traffic signal having lenses with bands. Each of these lenses has a generally central portion provided as a solid material that is different from the outer portions of the lens and that focuses, diffuses, or otherwise refracts the light transmitted therethrough. Thus, the central portions of each of these lenses cause optical losses to the light rays transmitted therethrough similar to the lenses of Dick et al., Alston, and You et al. described above.

Accordingly, what is needed but not found in the prior art is a lens system for use with LEDs in illuminated signs and signals that refracts certain lights rays from an undesirable direction to a desirable direction and that allows light rays directed toward their intended viewing area and/or viewer to be transmitted through the lens without being refracted and with little or no optical losses.

SUMMARY OF THE INVENTION

Generally described, the present invention provides an optic lens cell for an illuminated sign or signal, the cell having at least one and preferably a plurality of light sources each with a central axis of light emission. The cell also has at least one lens spaced apart from the light source, the lens having at least one and preferably a plurality of convex portions each with an aperture that has a central axis generally parallel to the light source central axis. The light source and lens are mounted on a board. The light source is capable of being electrically connected to a power source such as but not limited to 120/240VAC, a battery, a photovoltaic cell, a generator, or the like. When the light source is powered, a portion of the light rays emitted from each LED are redirected by the lens convex portions and a portion of the emitted light rays are allowed to pass through the apertures, resulting in an overall distribution of light that is highly efficient.

In a preferred embodiment of the present invention, the light sources are provided by LEDs with each LED axis and aperture axis being generally collinear. Also, the lens convex portions each have a central axis and the aperture is arranged in the lens so that each aperture central axis is generally collinear with each lens central axis. Each lens convex portion is generally convex about two axes and each aperture is cylindrical. The LEDs are mounted on a circuit board and wired together so they operate as one. A plurality of the cells may be combined together into an array and contained by a housing to form a sign or signal. An electric control may be provided with the housing or remotely located for timing and other control functions of the cells. Each cell is capable of being independently operated for forming various lighted patterns as may be desired for traffic lights, portable roadside lights, commercial signs and the like.

In a first alternative embodiment of the lens, the convex portion is convex about one axis and the aperture is generally cylindrical. In a second alternative embodiment of the lens, the convex portion is convex about one axis and the aperture is in the form of a slot. In a third alternative embodiment of the lens, the convex portion is convex about two axes and the aperture is in the form of a slot. In a fourth alternative embodiment of the lens, the convex portion is convex about two axes and the aperture is in the general shape of a frustum. In a fifth alternative embodiment of the lens, the convex portion is a semi-circular segment of the convex lens of the preferred embodiment and the aperture is semi-circular. In a sixth alternative embodiment of the lens, the convex portion is convex about two axes, the aperture is generally cylindrical, and the LED axis and the aperture axis are offset. Other lens shapes and geometries are possible, including back-to-back convex lens.

For construction and installation of the present invention, the cells are combined into the array, electrically connected to the electric control, and enclosed within the housing to form an illuminating sign or signal for any of a wide variety of lighting applications such as those described herein. The sign may then be installed in a variety of arrangements including mounted on poles or other supports, suspended from cables, mounted on a towable trailer or the like, mounted onto a building structure, or the like, and electrically connected to the power source of any type described herein.

In the use the present invention, the electric control operates to allow the energization of cells as desired to provide a lighted pattern. The low intensity light rays are maximally utilized by refracting the rays back toward the LED axis and the high intensity light rays are maximally utilized by allowing them to pass through the aperture without refraction and with little or no optical losses. The resulting light redistribution thereby harnesses generally a maximum amount of light emitted from the LEDs and directs the light with a minimum of optical loss toward the intended viewing areas and/or viewers.

Accordingly, it is an object of the present invention to provide an optical lens for illuminated signage that is highly efficient in redistributing and focusing light rays so that a low intensity light source may be used to achieve the same light intensity as a higher intensity light source and/or the same intensity light may be produced using fewer light sources to achieve a smaller lens system.

It is another object to provide an optical lens that receives light rays directed in an undesired direction and redirects these light rays by refraction in a desired direction.

It is still another object to provide an optical lens that transmits lights rays therethrough that are directed in a desired direction without refraction and with minimal or no optical losses.

It is a further object to provide an optical lens cell that may be arranged with a plurality of like cells in an array to form an illuminated sign or signal with the cells operating to efficiently transmit and redirect LED light therethrough to form highly visible lighted patterns.

It is yet another object to provide an optical lens cell and an illuminated sign having a plurality of the cells, the cells and other sign components being commercially available and/or capable of being economically manufactured in a wide variety of arrangements for use in a wide variety of lighting applications.

These and other objects, features, and advantages of the present invention are discussed or apparent in the following detailed description of the invention, in conjunction with the accompanying drawings and the appended claims.

BRIEF DESCRIPTION OF THE DRAWINGS

The various features and advantages of the invention will be apparent from the attached drawings, in which like reference characters designate the same or similar parts throughout the figures, and in which.

DETAILED DESCRIPTION OF THE PREFERRED EMBODIMENTS

Figure 1:
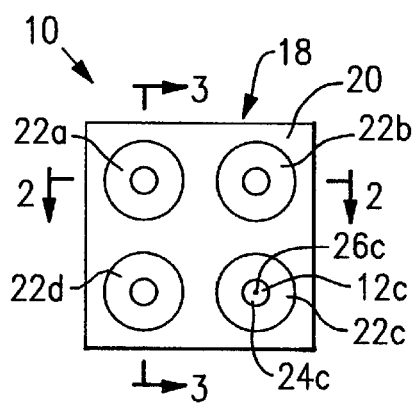
FIG. 1 is a front elevation view of an optic lens cell of a preferred embodiment of the present invention.
Figure 2:
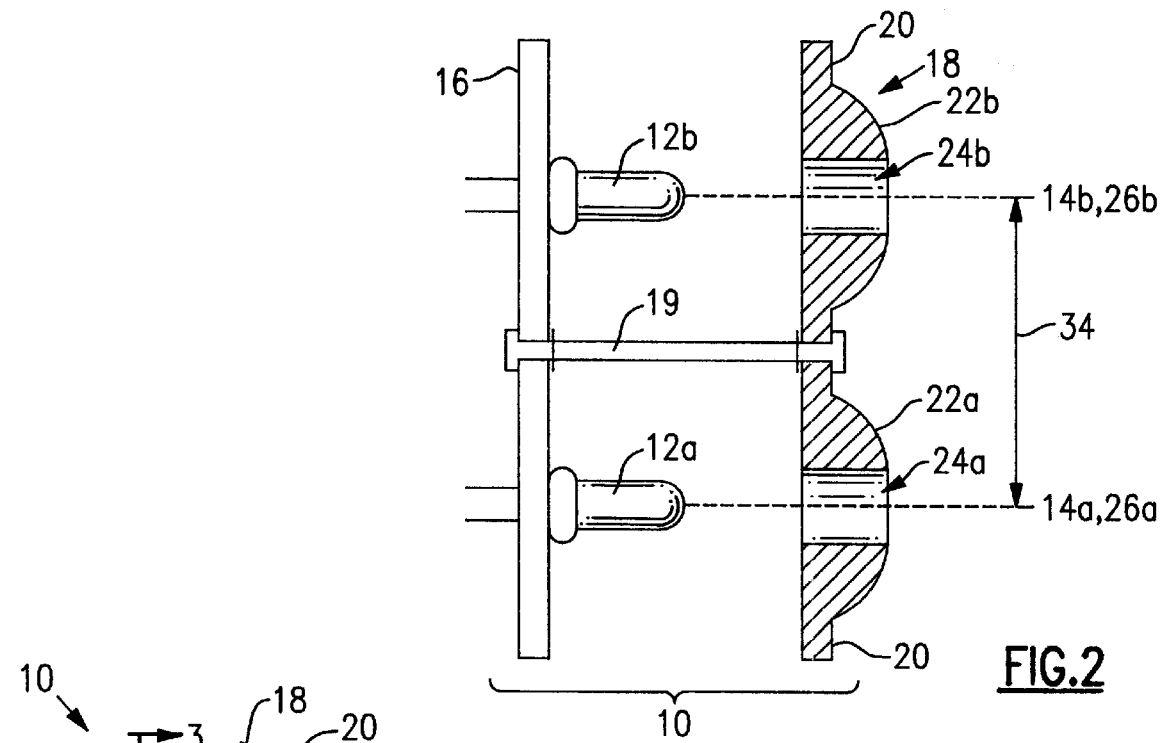
FIG. 2 is a section view taken at line 2—2 of FIG. 1.
Figure 3:
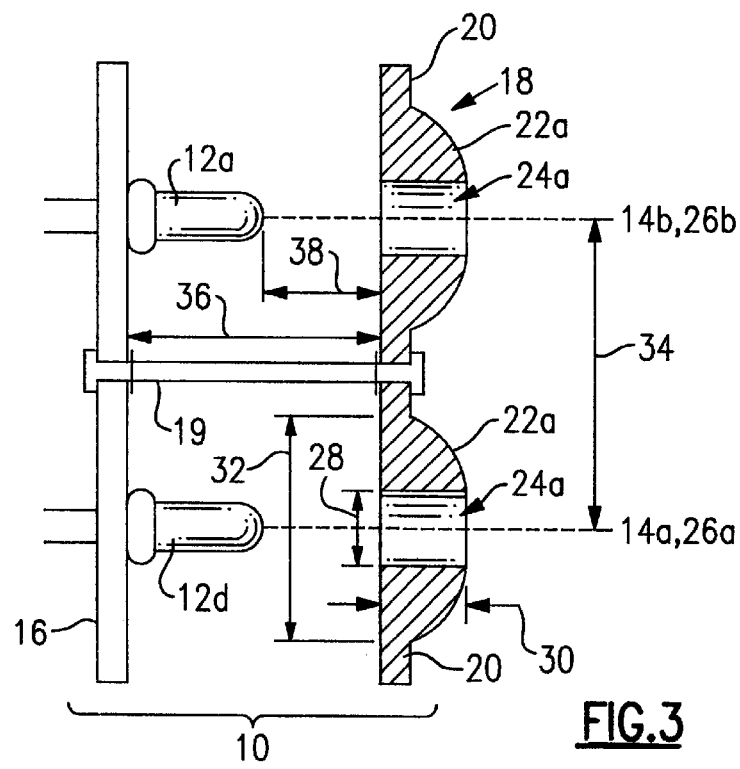
FIG. 3 is a section view taken at line 3—3 of FIG. 1.

Referring now to FIGS. 1–3, there is illustrated a preferred embodiment of an optical cell 10 of the present invention. The cell 10 comprises at least one and preferably four conventional LEDs 12a–d (collectively referred to as LEDs 12). It is to be understood that a greater or lesser number of LEDs may be used. Alternatively, LCDs, LCIDs, incandescent bulbs, cathode ray tubes, fluorescent light, electroluminescent light, lasers (or other coherent light sources), or other light sources known to those skilled in the art can be used or adapted for use with the present invention. For purposes of illustration only, LEDs will be discussed herein. Each LED 12 has a central axis of light emission 14, and the LEDs 12 are preferably oriented with their central axes 14 generally parallel.

The LEDs 12 are mounted to at least one board 16 with an adhesive or by other mounting methods known to those skilled in the art and electrically connected to a power source (not shown) such as 120/240VAC, a battery, a photovoltaic cell, a generator, or the like. The board 16 is preferably provided by a conventional circuit board with electric conductors embedded in the surface of the board 16 so that each LED 12 may be electrically connected thereto and all the LEDs 12 on one board 16 may thus be electrically interconnected for coincidental operation. Optionally, the LEDs 12 and/or their wiring may extend through apertures defined in the board 16 for independent electrical connection to the power source so that each LED 12 may be individually operated. It should be noted that other arrangements may be suitably employed, such as electrically interconnecting the LEDs 12 by conventional wiring. In such an arrangement, the board 16 may be made of a plastic, metal, ceramic, composite, or other material known to those skilled in the art.

At least one lens 18 is provided in each cell 10, the lens 18 preferably molded from a polycarbonate or acrylic material. Optionally, the lens 18 may be made of a thermoplastic resin or other material and fabricated by other methods known to those skilled in the art. The lens 18 may be generally transparent or have a tint or other light filter for producing a visible color as may be desired in a given application. The lens 18 and board 16 are preferably oriented in a generally parallel and spaced apart arrangement. The lens 18 is preferably rigidly attached to the board by a mounting member 19 such as a pin, rod, bracket, block, unitary arm extending from the lens 18, or other mounting mechanism known to those skilled in the art and selected to generally prevent movement of the lens 18 relative to the board 16 and to not interfere with light from the LEDs 12. The board 16 and lens 18 are preferably generally rectangular so that the resulting cell 10 has a generally rectangular shape. Optionally, the cell 10 may have a triangular, hexagonal, octagonal, other regular or irregular shape known to those skilled in the art.

Each lens 18 preferably comprises a generally flat lens portion 20. The lens 18 is provided with at least one, preferably a plurality of, and most preferably four convex lens portions 22a–d (collectively referred to as convex lens portions 22) integrally formed thereon. At least one aperture 24 is defined in each lens 18 with the number of apertures 24 preferably equal to the number of LEDs 12 in the cell 10. In the preferred embodiment having four LEDs 12a–d per cell 10, for example, it is desirable to provide four apertures 24a–d (collectively referred to as the apertures 24) per cell 10. While the preferred cell 10 described herein provides four LEDs 12, convex lens portions 22, and apertures 24, it should be noted that there may be applications where it would be suitable to provide a cell 10 having only one LED 12 and one convex lens 22 with one aperture 24 defined therein.

Each aperture 24a–d has a central axis 26a–d that is generally parallel to all the LED central axes 14a–d. The aperture axes 26a–d are preferably generally collinear relative to the corresponding LED axes 14a–d, though optionally the aperture axes 26a–d and the LED axes 14a–d may be offset as desired for a given application. Also, the aperture axes 26a–d preferably have smooth sidewalls for minimal light refraction and may be provided with a reflective layer as desired for a given application.

The apertures 24 preferably have a diameter 28, the convex lens portions 22 have a thickness 30, curvature 31 and diameter 32, and the LEDs 12 have a spacing 34. Also, the lens 18 and the board 16 have a spacing 36 selected to provide a desired spacing 38 between the lens 18 and the LED 12. The aperture diameter 28, the convex lens thickness 30, curvature 31 and diameter 32, the LED spacing 34, and the lens/LED spacing 38 are selected to achieve a generally maximum intensity and a generally minimum optic loss, as described below.

Figure 4:
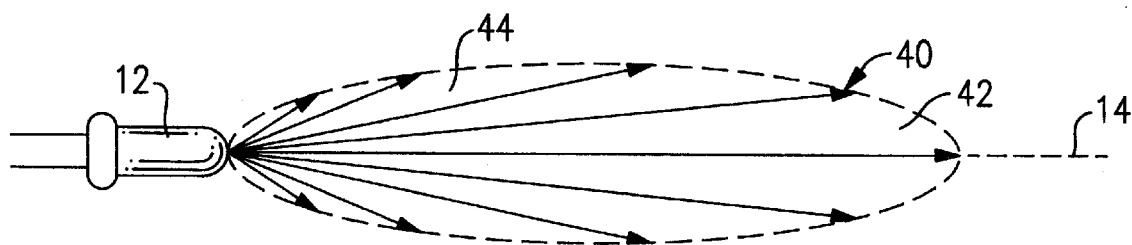
FIG. 4 is a side elevation view of a typical light distribution of an LED.

Referring further to FIG. 4, there is illustrated an LED 12 and a profile of a typical distribution of light rays 40 which have a direction and magnitude as shown thereby producing a generally ellipsoidal shape. A high intensity section noted generally as lightly shaded area 42 of the light ray distribution 40 is directed generally along LED axis 14 and/or within a generally conical distribution centered about the axis 14. A low intensity section noted generally as darkly shaded area 44 of the light rays is provided by the balance of the ellipsoidal light ray distribution 40 not within the conical high intensity section 42.

Figure 5:
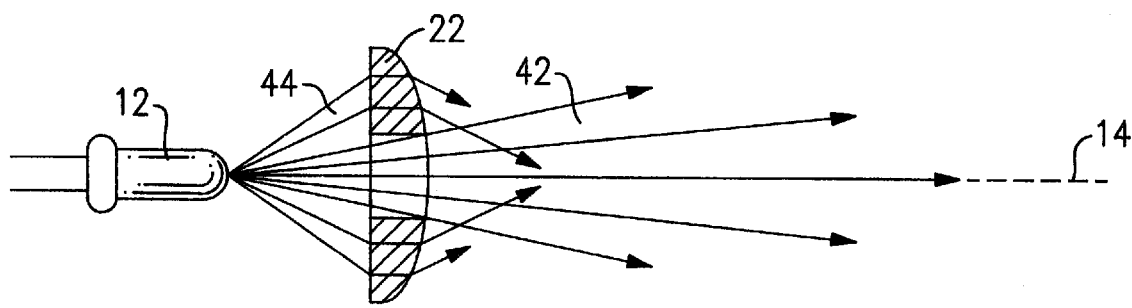
FIG. 5 is a side elevation view of the light redistribution resulting from use of the preferred convex lens portion.

Referring further to FIG. 5, there is illustrated a preferred light ray redistribution 46 produced by the convex lens portion 22 with the aperture 24. The low intensity section 44 of the light distribution 40 is received and refracted by the convex lens portion 22 to a direction back towards the LED axis 14, thereby harnessing, focusing and redirecting this otherwise lost and unused section of the light distribution 40. The high intensity section 42 of the light distribution 40 is allowed to pass through the aperture 24 unhindered and onward along the LED axis 14 and toward the intended viewing area, with substantially no optical losses imparted by the convex lens 22.

The aperture diameter 28, the convex lens thickness 30, curvature 31, and diameter 32, the LED spacing 34, and the lens/LED spacing 38 are preferably selected to produce the light ray distribution 46 of FIG. 5. The convex lens diameter 32 and the lens/LED spacing 38 are preferably selected so that substantially all of the typical distribution 40 is received by the convex lens portion 22. The convex lens diameter 32 and the lens/LED spacing 38 are related in that the greater the spacing 38 the greater must be the lens diameter 32 in order to capture substantially all of the light ray distribution 40.

The convex lens thickness 30 and curvature 31 are selected based on the desired index of refraction for the lens. Where the intended viewing area is relatively closer to the convex lens 22, for example for use in a typical marquee or like commercial message or advertising sign, then it is desirable to redirect the low intensity light rays 44 at a relatively smaller angle back toward the LED axis 14, so a convex lens portion 22 with a relatively greater curvature and thus thickness 30 would be selected. Where the intended viewing area is relatively farther from the convex lens 22, for example for use in a roadside traffic control sign for construction areas or a flashing railroad crossing light where the primary design consideration is to alert motorists of a condition from far away, then it is desirable to redirect the low intensity light rays 44 at a relatively smaller angle back toward the LED axis 14, so a convex lens portion 22 with a relatively greater curvature and thus thickness 30 would be selected.

The aperture diameter 28 is selected to allow high intensity light rays 42 to be transmitted through the convex lens 22 without suffering optical losses that reduce the light intensity. The farther the convex lens 22 is arranged from the board 16, the greater must be the aperture diameter 28. Generally, the aperture diameter 28 is preferably sufficiently large to allow lights rays of about a median magnitude of intensity and greater to pass through, based on a given lens/LED spacing 38. Also, the aperture diameter 28 is preferably sufficiently small to prevent or discourage the intrusion and accumulation of insects, dirt, moisture, and other undesirable contaminants which reduce light transmission efficiency.

The LED spacing 34 is selected to provide the desired overall brightness of the cell 10. A relatively greater LED spacing 34 provides the LEDs 12 more sparsely arranged and thus less intense, and a relatively lesser LED spacing 34 provides the LEDs 12 more densely arranged and thus more intense. It should be noted that the LED spacing 34 may be relatively large and the diameter 32 of the convex lens option 22 may be relatively small such that the lens flat portion 20 has a substantially larger area than the convex lens portions 22, or the LED spacing 34 may be relatively small and the diameter 32 of the convex lens option 22 may be relatively large such the lens 18 is a series of interconnected convex portions 22 with a generally scalloped profile and with relatively little or no flat portion 20.

In the preferred embodiment, the aperture diameter 28, the lens thickness 30, and the lens/LED spacing 38 are preferably approximately the same. Also, the LED spacing 34 is preferably approximately three times the aperture diameter 28. While these general relationships are applicable to the cell 10 of the preferred embodiment, those skilled in the art will appreciate that the cells 10 are adaptable to a variety of lighting applications which adaptation may include variations in these relationships.

Figure 6:
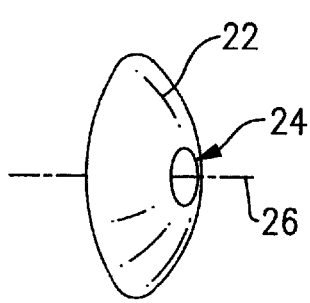
FIG. 6 is a perspective view of the preferred convex lens portion.

Referring now to FIG. 6, there is illustrated the preferred convex lens portion 22 which is convex about two axes, that is, having the general shape of a solid dome, with a cylindrical aperture 24 defined generally centrally therein about the central axis 26 of the convex portion 22. This configuration convex lens 22 provides refraction of the low intensity light rays 44 in all directions back toward the LED axis 14, while allowing the high intensity light rays 42 to pass through the lens 22 unhindered, resulting in a high intensity and brightness light output.

Figure 7:
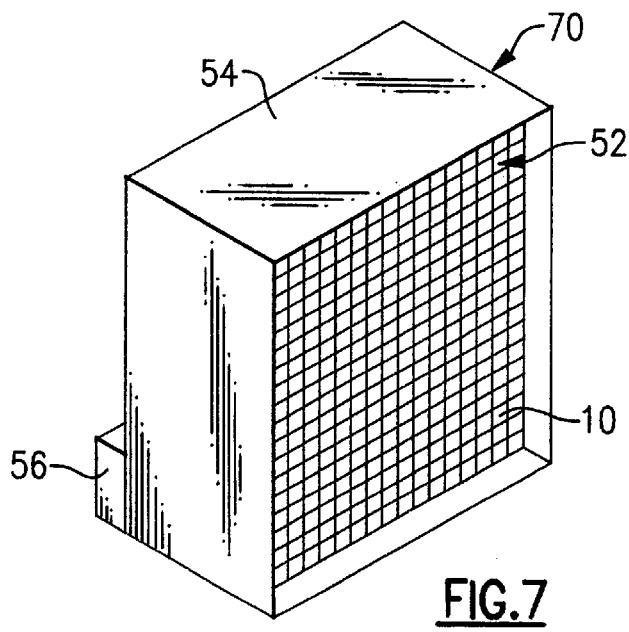
FIG. 7 is a perspective view of an array of the optic cells arranged in a representative illuminated sign housing.

Referring now to FIG. 7, there is illustrated an illuminated sign 50 comprising a plurality of the optics cells 10 described heretofore combined into an array 52. The array 52 is generally contained within a housing 54 of a conventional type, made of a metal, plastic, composite, or other material known to those skilled in the art, and having a generally rectangular or other regular or irregular shape known to those skilled in the art.

The cells 10 may be formed together into the array 52 by various ways. Preferably, the cells 10 are mounted to a plate (not shown) within the housing 54 by fasteners such as brackets, screws, or other fasteners known to those skilled in the art. Alternatively, the cells 10 may be connected together into a generally rigid sheet by fasteners such as brackets, screws, or other fasteners known to those skilled in the art. Also, a panel may be provided having female electrical plug receptacles for receiving male electrical plug prongs extending from the board 16 and electrically connected to the LEDs for a modular arrangement wherein cells 10 may simply and easily be plugged and unplugged from the panel.

A generally transparent thin cover may be provided over the array 52 of cells 10 and attached to the housing 54 for preventing the ingress of moisture, dirt, insects, and other undesired intrusions while imparting only minor, if any, optical losses to the light rays 42 and 44 transmitted therethrough. Also, the housing 54 may be provided with openings at a generally lower front portion for drainage of any moisture that intrudes into the cells 10 through the apertures 24 or openings in the housing 54.

An electric control 56 is preferably provided within or attached to the housing 54. Optionally, the electric control 56 may be provided at a remote location such as a signalization box. The electric control 56 is electrically connected to the array 52 and capable of being electrically connected to a power source such as 120/240VAC at a utility transformer for fixed location traffic signal heads or a generator and/or batteries for portable road signs. Each cell 10 is preferably individually electrically connected to the control 56 so that each cell 10 may be operated individually within the array 52 to form lighted patterns including word messages, standardized traffic symbols, customized commercial displays, color schemes, combinations of these, and the like.

Figure 8:
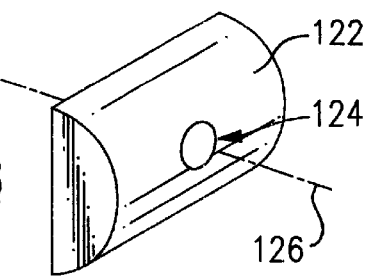
FIG. 8 is a perspective view of a convex lens portion of a first alternative embodiment.

Referring now to FIG. 8, there is illustrated a first alternative embodiment comprising convex lens portion 122 which is convex about one axis, that is, having the general shape of a solid barrel vault, with a cylindrical aperture 124 defined generally centrally therein about the central axis 126 of the convex portion 122. This configuration convex lens 122 provides refraction of the low intensity light rays 44 about one axis back toward the LED axis 14 and allows an angular dispersal of the low intensity light rays 44 relative to another axis, which may be desirable in applications where a wide field of view horizontally is intended while light rays directed upward or downward are to be redirected toward the LED axis 14 as they would otherwise be lost and unused.

Figure 9:
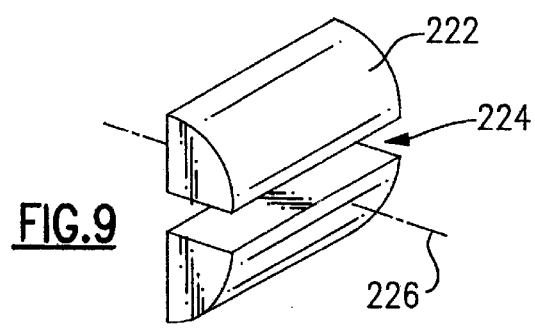
FIG. 9 is a perspective view of a convex lens portion of a second alternative embodiment.

Referring now to FIG. 9, there is illustrated a second alternative embodiment comprising a convex lens portion 222 which is convex about one axis and has an elongated aperture 224 or slot defined therein and coextensive therewith such that the resulting convex portion 224 comprises two wedge shaped segments. Similar to the convex lens 122 of FIG. 8, this configuration convex lens 222 provides refraction of the low intensity light rays 44 about one axis back toward the LED axis 14 and allows an angular dispersal of the low intensity light rays 44 relative to another axis, and further this convex lens 222 allows an angular dispersal of the high intensity light rays 44 relative to the same another axis, which may be desirable in applications where a wide field of view horizontally is intended while light rays directed upward or downward are to be redirected toward the LED axis 14 as they would otherwise be lost and unused.

Figure 10:
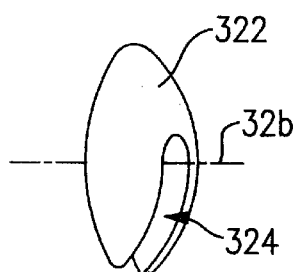
FIG. 10 is a perspective view of a convex lens portion of a third alternative embodiment.

Referring now to FIG. 10, there is illustrated a third alternative embodiment comprising a convex lens portion 322 which is convex about two axes and has an elongated aperture 324 or slot defined therein and extending from about the central axis 326 through a peripheral edge 325 of the convex portion 322. This configuration convex lens 322 provides refraction of the low intensity light rays 44 in all directions back toward the LED axis except the low intensity light rays 44 that are directed generally downward are allowed to continue generally downward without being refracted or otherwise suffering optical loss imparted by the lens, which may be desirable where the optic cell 10 is elevated relative to the intended viewer such as in a traffic signal head.

Figure 11:
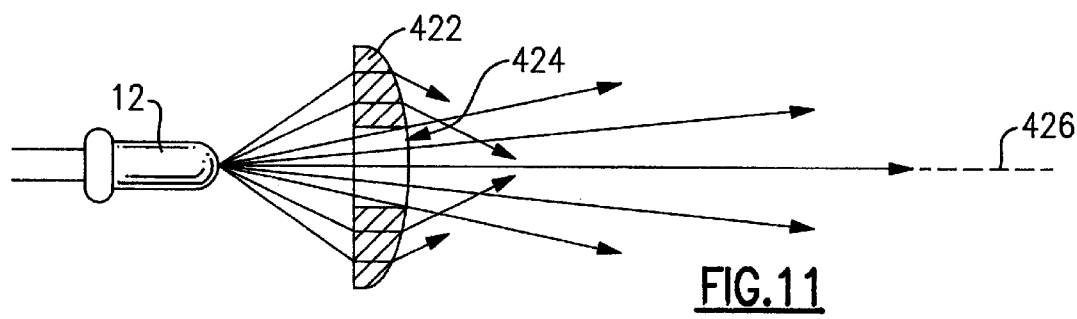
FIG. 11 is a side elevation view of a convex lens portion and the corresponding light redistribution of a fourth alternative embodiment.

Referring now to FIG. 11, there is illustrated a fourth alternative embodiment comprising a convex lens portion 422 which is convex about two axes and has a frustum-shaped aperture 424 defined generally centrally therein about a central axis 426 of the convex portion 422 with a smaller diameter closer to the LED 12 and a larger diameter farther from the LED 12. This configuration convex lens 422 is similar to the convex lens 22 of the preferred embodiment in that it provides refraction of the low intensity light rays 44 in all directions back toward the LED axis 14 for a high intensity and brightness light output, and further the aperture 424 has tapered sidewalls generally conforming to the conical shape of the high intensity light ray distribution 42 for even greater optical efficiency. It should be noted that manufacturing considerations may also influence the selection of the size and shape of the aperture 24.

Figure 12:
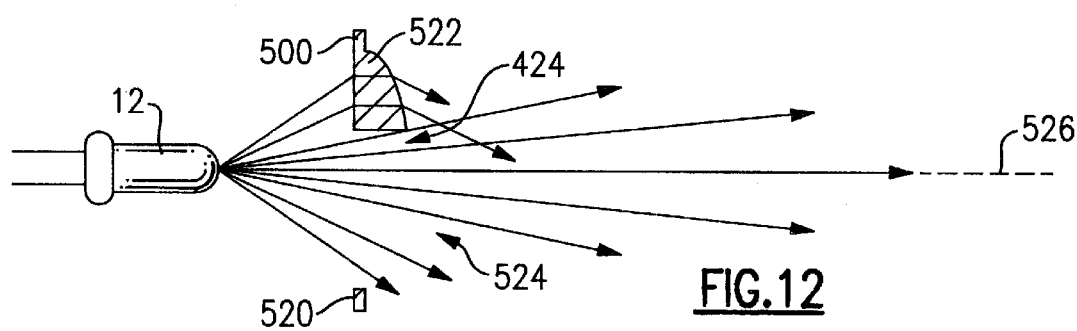
FIG. 12 is a side elevation view of a convex lens portion and the corresponding light redistribution of a fifth alternative embodiment.

Referring now to FIG. 12, there is illustrated a fifth alternative embodiment comprising convex lens portion 522 which comprises a semi-circular segment of the convex lens portion 22 of the preferred lens 18, a generally flat portion 520 similar to the flat portion 20 of the preferred lens 18, and a semi-circular aperture 524 defined therein. This configuration convex lens 522 receives those low intensity light rays 44 directed generally upward above the LED axis 14 and refracts them light back toward the LED axis 14 while allowing those low intensity light rays 44 directed generally downward to pass through the aperture 524 unhindered, which may be desirable where the optic cell 10 is elevated relative to the intended viewer such as in a traffic signal head.

Figure 13:
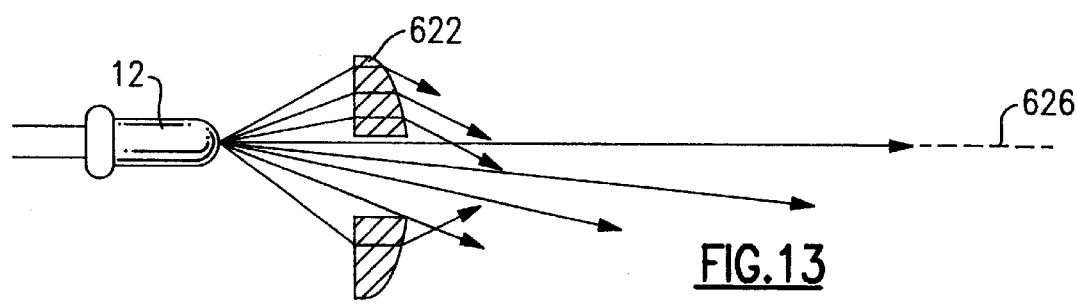
FIG. 13 is a side elevation view of a convex lens portion and the corresponding light redistribution of a sixth alternative embodiment.

Referring now to FIG. 13, there is illustrated a sixth alternative embodiment comprising a convex lens portion 622 which is convex about two axes and has an aperture 624 defined therein in a similar arrangement to the preferred convex lens 22 and aperture 24. Whereas in the preferred embodiment the LED axis 14 and the aperture axis 26 are generally collinear, however, in the sixth alternative lens arrangement the LED axis 14 and the aperture axis 626 are offset. This configuration convex lens 522 receives all low intensity light rays 44 and high intensity light rays 42 directed generally upward above the LED axis 14 and refracts them light back toward the LED axis 14 while allowing all high intensity light rays 42 and a portion of the low intensity light rays 44 directed generally downward to pass through the aperture 524 unhindered, which may be desirable where the optic cell 10 is elevated relative to the intended viewer such as in a traffic signal head. Other convex lens shapes and geometries may be used, including back-to-back convex lens portions.

For construction and installation of the present invention, the cells 10 are combined into the array 52, electrically connected to the electric control 56, and enclosed within the housing 54 to form an illuminating sign or signal 50. As described hereinabove, all the components are either commercially available or are capable of being easily manufactured from readily available materials. The number, size, shape, and lens tint of the cells 10 may be selected for any desired application. The cells 10 for a particular array 52 are preferably generally uniform in shape and size and may be easily combined into an array 52 to form an illuminated sign 50 for any of a wide variety of lighting applications such as those described herein.

The sign 50 may then be installed in a variety of arrangements. For traffic and pedestrian signal heads, the sign 50 may be fixedly mounted at a traffic intersection on a signalization pole, a dedicated pole, or the like, or suspended from cables over the intersection. For portable road signs, the sign may be mounted on a towable trailer or the like with a battery or electrical connections for connecting to a separate generator. For commercial and/or advertising signs, the sign 50 may be mounted onto a building structure, a pole, or the like and electrically connected to a power source of any type described above.

In the use the present invention, the electric control 56 operates to allow the energization of cells 10 as desired to provide a lighted pattern. The low intensity light rays 44 are maximally utilized by refracting the rays back toward the LED axis 14 and the high intensity light rays 42 are maximally utilized by allowing them to pass through the aperture 24 without refraction and with little or no optical losses. The resulting light redistribution thereby harnesses generally a maximum amount of light emitted from the LEDs and directs the light with a minimum of optical loss toward the intended viewing areas and/or viewers.

Accordingly, there are a number of advantages provided by the present invention. The optic cells are highly efficient in redistributing and focussing light rays so that a low intensity light source may be used to achieve the same light intensity as a higher intensity light source and/or the same intensity light may be produced using fewer light sources to achieve a smaller lens system.

Each lens has a convex portion that provides the advantage of receiving light rays directed in an undesired direction and redirecting these light rays by refraction in a desired direction.

Additionally, each lens has an aperture defined therein that provides the advantage of transmitting lights rays therethrough that are directed in a desired direction without refraction and with minimal or no optical losses.

Furthermore, each optic cell may be combined in an arrangement with a number of like cells in an array to form an illuminated sign or signal with the cells operating to efficiently transmit and redirect LED light therethrough to form highly visible lighted patterns.

Moreover, all the components of the optic cell and the illuminated sign generally are commercially available and/or capable of being economically manufactured in a wide variety of arrangements providing the advantage of flexibility in combining the optic cells in a wide variety of arrangements for a wide variety of lighting applications.

While the invention has been described in connection with certain preferred embodiments, it is not intended to limit the scope of the invention to the particular forms set forth, but, on the contrary, it is intended to cover such alternatives, modifications, and equivalents as may be included within the true spirit and scope of the invention as defined by the appended claims. All patents, applications and publications referred to herein are hereby incorporated by reference in their entirety.

What is claimed is:

1. An optic lens cell for an illuminated sign or signal, comprising:
    a) a plurality of light sources each having a central axis of light emission; and
    b) at least one lens spaced apart from said light source, said lens comprising a generally flat lens portion having a plurality of convex portions integrally formed thereon, each of said convex portions having an aperture defined therein with a central axis that is generally parallel to one of said light source central axes;
    wherein said light sources are capable of being electrically connected to a power source, each of said light sources is capable of emitting light rays with a first portion of said light rays redirected back generally toward said light central axis by said lens convex portion and a second portion of said light rays passing through said aperture.

2. The optic lens cell of claim 1, wherein said light source axis and said aperture axis are generally collinear.

3. The optic lens cell of claim 1, wherein said light source axis and said aperture axis are parallel and offset.

4. The optic lens cell of claim 1, wherein said lens aperture has a diameter such that said second portion light rays have a median or greater magnitude relative to said first and second portion light rays.

5. The optic lens cell of claim 1, wherein said lens convex portion has a central axis and said aperture is arranged in said lens so that said aperture central axis is generally collinear with said lens central axis.

6. The optic lens cell of claim 1, wherein said lens convex portion is convex about two axes.

7. The optic lens cell of claim 1, wherein said lens convex portion is convex about one axis.

8. The optic lens cell of claim 1, wherein said aperture is in the form of a generally cylindrical opening.

9. The optic lens cell of claim 6, wherein said aperture is in the form of a generally cylindrical-shaped opening.

10. The optic lens cell of claim 1, wherein said aperture is in the form of a slot.

11. An optic lens cell for an illuminated sign or signal, comprising:
   a) at least one light source having a central axis of light emission; and
   b) at least one lens spaced apart from said light source and having at least one convex portion and at least one aperture defined therein, said aperture having a central axis that is generally parallel to said light source central axis, wherein said aperture is in the form of a generally frustum-shaped opening with a smaller diameter closer to said light source and a larger diameter farther from said light source;

wherein said light source is capable of being electrically connected to a power source and capable of emitting light rays, a first portion of said light rays are redirected back generally toward said light central axis by said lens convex portion and a second portion of said light rays pass through said aperture.

12. The optic lens cell of claim 1, further comprising at least one board on which said at least one light source is mounted.

13. The optic lens cell of claim 12, wherein said lens is attached to said board.

14. The optic lens cell of claim 12, wherein said board is provided by a circuit board having electric circuit wiring embedded thereon.

15. The optic lens cell of claim 1, wherein a plurality of said cells are arranged in an array with each cell capable of being electrically connected to said power source.

16. The optic lens cell of claim 1, further comprising a housing capable of generally containing said at least one light source and said at least one lens.

17. The optic lens cell of claim 15, further comprising a housing capable of generally containing said plurality of light sources and said plurality of lens.

18. The optic lens cell of claim 1, further comprising an electric control that is electrically connected to said light source for operation thereof, wherein said control is associated with said sign and is capable of being electrically connected to said power source.

19. An optic lens cell for an illuminated sign or signal, comprising:
   a) four light emitting diodes, each having a central axis of light emission and mounted and electrically connected to a circuit board having electric circuit wiring embedded thereon;
   b) a lens spaced apart from said light emitting diodes and attached to said circuit board, said lens having a generally flat portion and four convex portions integrally formed thereon, each convex portion having one generally cylindrical aperture defined therein, each aperture having a central axis that is generally collinear with one of said four light emitting diodes axes, wherein each of said light emitting diodes is capable of being electrically connected to a power source and capable of emitting light rays, a first portion of said light rays are redirected back generally toward said light central axis by said lens convex portion and a second portion of said light rays pass through said aperture.

20. The optic lens cell of claim 19, wherein a plurality of said cells are arranged in an array with each cell capable of being electrically connected to said power source.

21. The optic lens cell of claim 20, further comprising a housing capable of generally containing said cell array.

22. The optic lens cell of claim 21, further comprising an electric control that is electrically connected to said light emitting diodes for operation thereof, wherein said control is associated with said housing and is capable of being electrically connected to said power source.

23. The optic lens cell of claim 19, wherein said lens aperture has a diameter such that said second portion light rays have a median or greater magnitude relative to said first and second portion light rays.

24. An illuminated sign, comprising:
   a) a plurality of optic cells arranged in an array; and
   b) a housing generally containing said cells;
   wherein each cell comprises a plurality of light sources and at least one lens, said light sources mounted on a circuit board and electrically connected together, each light source having a central axis of light emission, each light source capable of emitting light rays and said lens comprising a generally flat portion with a plurality of convex portions integrally formed thereon, each convex portion having a generally cylindrical-shaped aperture defined therein with a central axis that is generally parallel to one of said light source central axes, said lens spaced apart from said light sources and attached to said circuit board.

25. The illuminated sign of claim 24, wherein said cells of said array are capable of being electrically connected to a power source, a first portion of said light rays are redirected back toward said light axis by said lens convex portion and a second portion of said light rays pass through said aperture.

26. The illuminated sign of claim 24, wherein said lens aperture has a diameter such that said second portion light rays have a median or greater magnitude relative to said first and second portion light rays.

27. The illuminated sign of claim 24, wherein each said convex lens portion has a central axis and each said aperture is arranged in said lens so that said aperture central axis is generally collinear with said lens central axis.

28. The illuminated sign of claim 24, wherein said light sources comprises light emitting diodes.

29. The illuminated sign of claim 24, further comprising an electric control that is electrically connected to each of said cells for operation thereof, wherein said control is associated with said sign and is capable of being electrically connected to said power source.

30. The illuminated sign of claim 29, wherein said electric control is capable of allowing each cell to be energized by said power source independently of said other cells to form lighted patterns.

* * * * *